Figure 1:
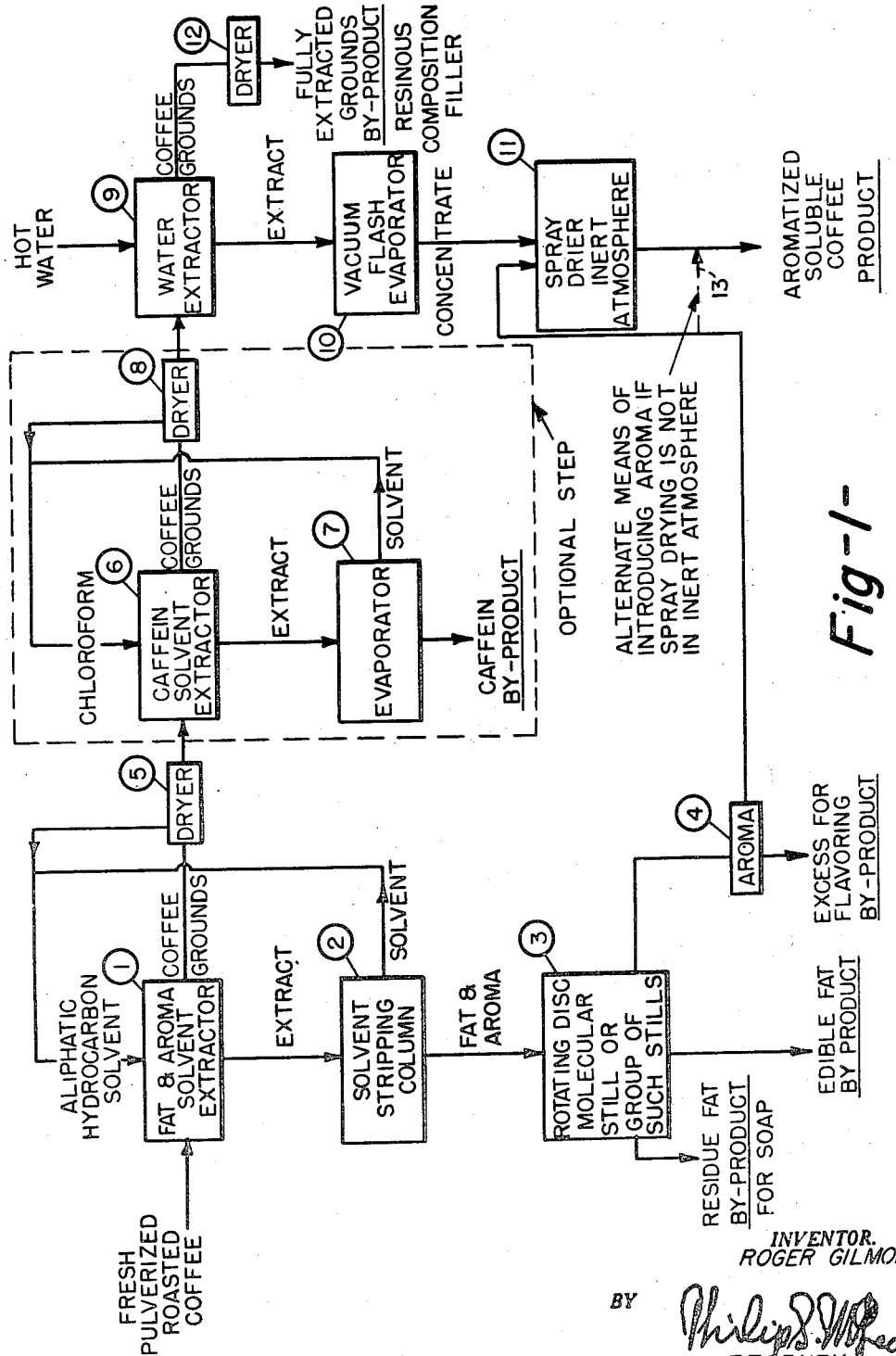

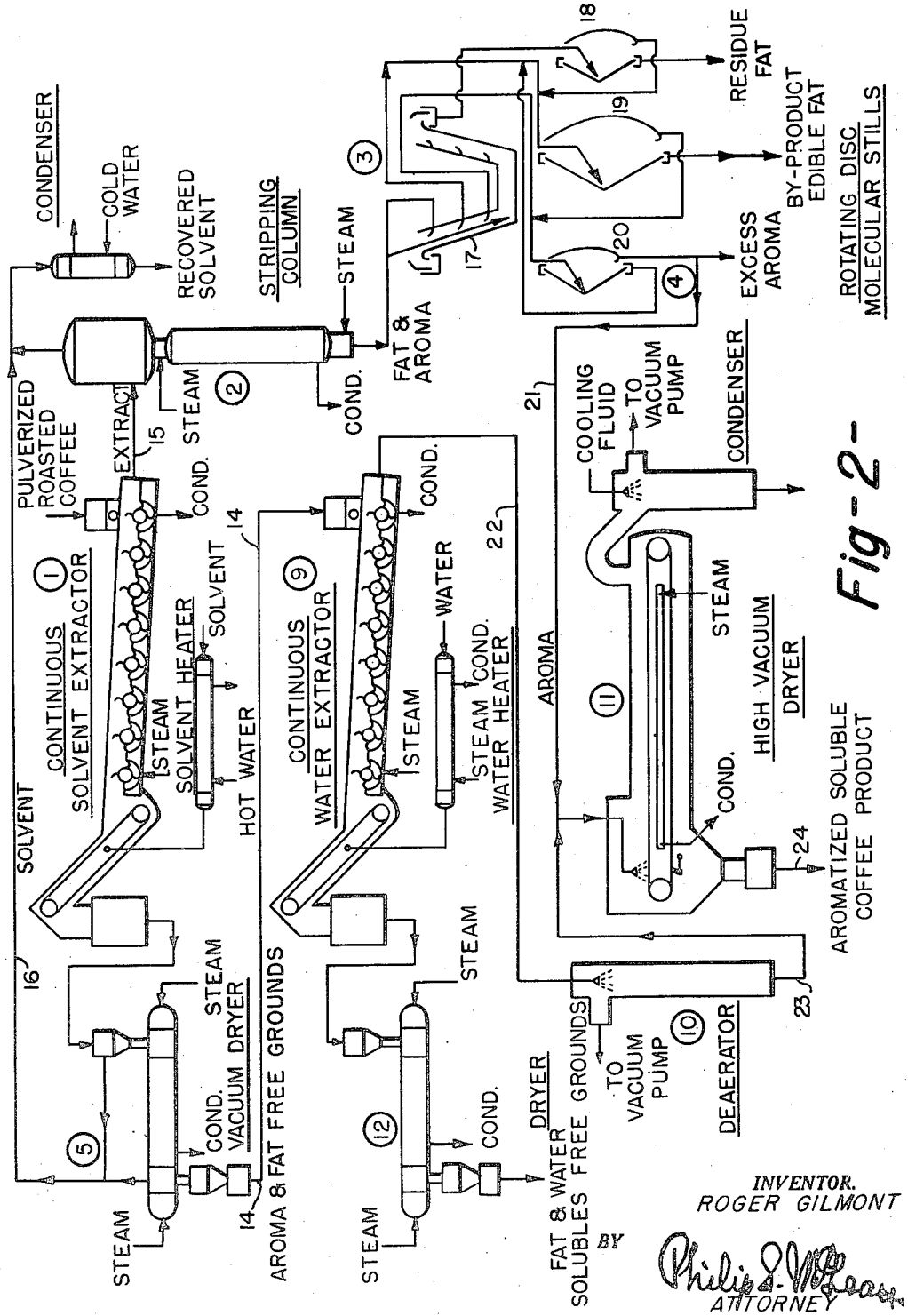

Patented Aug. 7, 1951

2,563,233

UNITED STATES PATENT OFFICE 2,563,233

PROCESS OF PRODUCING SOLUBLE COFFEE

Roger Gilmont, Brooklyn, N. Y.

Application June 17, 1949, Serial No. 99,785

14 Claims. (Cl. 99—71)

The invention herein disclosed relates to the production of a soluble coffee extract and by-products resulting from the manufacture of the same.

Primary objects of the invention are to attain a powdered soluble coffee product having the essential ingredients derived from freshly ground, roasted coffee and soluble in hot water to form a beverage having the flavor, aroma and desirable effects of freshly brewed coffee.

An important purpose of the invention is to save and retain useful by-products ordinarily lost in the preparation of soluble coffee extracts by usual commercial methods.

Other important objects of the invention are, when desired, to eliminate caffein from the soluble coffee product and to effect recapture of the eliminated caffein as a valuable by-product.

Special objects of the invention are to avoid detrimental effect upon the aroma constituents such as might lead to their contamination or decomposition or chemical conversion, particularly to avoid the detrimental effect of water or steam upon such constituents.

Further special objects of the invention are to accomplish separation of the fat and aroma constituents without decomposition of either the fat or the aroma.

Another and related object of the invention is to save the fat constituent as an edible fraction of wide usage such as for salad oil, mayonnaise, and the like.

Other special objects of the invention are to extract all the aroma present, in fact more than can be obtained by normal hot water extraction, and to use this as may be required, returning such as may be desired to the coffee concentrate, and utilizing the excess aroma as a natural coffee flavoring by-product and the like.

Further special objects of the invention are to effect extraction of the grounds to the point where they will be free of fatty and water soluble materials which might interfere with adherence to a plastic or resinous binder, and therefore rendering such grounds suitable for manufacture of synthetic boards and other fabrications.

Objects of the invention, further, are to provide a process for the accomplishment of the above which will be practical and economical and which can be performed largely with equipment of accepted commercial design.

Other desirable objects and the novel features through which the purposes of the invention are attained are set forth or will appear in the course of the following specification.

The drawings accompanying and forming part of the specification illustrate an approved design and method of operation, but it will be appreciated that modifications and changes may be made, all within the true spirit and broad scope of the invention as hereinafter defined and claimed.

Fig. 1 in the drawings is a diagram on the order of a flow sheet illustrating successive and alternate stages in the operation of the invention;

Fig. 2 is a generally similar view typifying equipment which may be advantageously combined to effect the carrying out of the invention.

Referring to Fig. 1, the first step in the process is the extraction at 1 of fresh, pulverized, roasted coffee with an organic solvent for the fat and aroma constituents, specifically one that contains no reactive group that might spoil or contaminate the fat or aroma constituents.

Such a solvent is one of the aliphatic hydrocarbons or mixtures thereof having a boiling point range of approximately 30–70° C. The most suitable solvents have been found to be pentane or hexane, or mixtures of the two. Petroleum ether, which is normally a mixture of these hydrocarbons having the above boiling point range, has been found to work exceedingly well, in contrast to solvents recommended in the prior art containing reactive groups such as ethyl ether (ether linkage), acetone (keto group), ethyl alcohol (hydroxyl group), benzene (aromatic), carbon tetrachloride (chloride), which all have a detrimental effect upon the aroma constituents, tending to contamination or decomposition or chemical conversion.

Water or steam, in fact, have a detrimental effect upon the aroma constituents and it is for this reason that preliminary extraction with the recommended solvent is effected before the later to be described water extraction. Thus undesirable contact of the aroma constituents with water is avoided in this first or preliminary stage.

This first, solvent extraction may be accomplished in a counter current continuous type of extractor, later referred to, and is preferably made at the boiling point of the solvent to exclude atmosphere.

The solvent extract from stage 1 is passed, as indicated, to a solvent stripping column 2, where the relatively volatile solvent is separated from the fat and aroma constituents, which are comparatively non-volatile.

Recommended procedure at this second stage is to employ a continuously operating still under vacuum, to decrease temperatures involved. It is desirable that the temperature of the fat and aroma constituents leaving the stripper 2, do not exceed 80–100° C., and this range allows for compromise as between maintaining low temperature and effecting more complete separation of solvent.

The solvent is returned, as indicated, to the extraction process 1, with make-up solvent added to replace losses.

The fat and aroma constituents from the solvent stripping stage are passed, as indicated, to a molecular still at 3, in which the decomposition hazard is reduced to a low value by virtue of the spreading of the distillant in a thin film on a rapidly rotating heated disc with which it makes contact for a fraction of a second, and by the maintaining of a high vacuum such as less than 15 microns, along with the heating.

This molecular distillation effects separation of the fat and aroma with no detectable decomposition of either the fat or the aroma, as distinct from the prior art practice of separating fat and aroma by saponification of the fat with alkali and which, in addition to exposing the aroma to harsh chemical treatment damaging to the aroma, causes those aromatic constituents which are saponifiable to be removed with the fat.

Another special advantage in the use of the rotating molecular still is that the greater part of the fat is obtained in an undamaged state, suitable for edible purposes.

The fat and aroma, removed from the coffee, unspoiled, by solvent extraction, are thus, by molecular distillation, separated, undamaged, ready for their separate uses.

The comparatively volatile components of the aroma which appear in the trap of the molecular still, have a strong, bitter taste and, except for those who prefer a particularly strong beverage, may be considered too heavy for beverage purposes and may be saved for flavoring or other purposes.

The first fractions, however, which are evolved at temperatures between 185 and 225° C. and pressures between 15 and 10 microns, contain the delicious and fragrant components of the aroma. These are saved and taken off at 4 in Fig. 1, to be used to fortify the soluble extract, with possible excess as a by-product for use for flavoring.

The edible fat fraction is evolved at temperatures between 240 and 260° C. and pressures around 6 to 8 microns.

The appearance of the fat fraction is such that it may be used directly for edible purposes without further treatment, except possibly for a clarification step to remove slight turbidity which may appear upon cooling and long standing.

The fat and aroma leaving the stripper 2 has a dark, reddish brown color, apparently caused by the aroma, since the fat itself appears as a clear, bright, yellow-orange oil, as distinct from the aroma, which appears as a very dark, reddish brown, semi-liquid material.

A blackish brown residue from the molecular distillation is taken off as indicated at 3 in Fig. 1, which may be used for soap making.

The edible fat fraction taken out at 3 is useful for salad oil, mayonnaise and the like, and of itself has a value justifying the expense of the molecular distillation.

The molecular distillation at 3 may be varied to modify and change the properties of the fractions. For example, lower temperatures and higher vacua may be employed to increase the more volatile component content of the aroma, to produce a product for individuals preferring a stronger or possibly somewhat bitter coffee taste.

Also, more than one molecular still will be necessary if the process is to be a continuous one and if it be preferred to put the aroma and fat components through additional fractionation to insure the more complete separation between them. Thus four such stills may be employed to advantage, as shown in the specific example of the system, in Fig. 2.

The fat and aroma-free grounds from the first, solvent extraction stage at 1, are shown as passed through a drier at 5 to release the small amount of solvent absorbed during the extraction. This solvent is condensed and returned, as indicated, to the process for subsequent extraction.

If a caffein-free product is desired, the dry fat and aroma-free grounds may be extracted with a specific solvent for caffein. Because of the particular sequence of extractions as here disclosed, it is desirable that the caffein extraction, if used, be performed at this stage.

One of the best solvents for caffein is chloroform. This also is a good solvent for the fat and the aroma but it produces undesirable changes in them. Both fat and aroma, however, have already been removed at this stage. The aliphatic hydrocarbon solvent used for effecting the removal of the fat and aroma is one of the best non-solvents for caffein. Caffein is practically insoluble in petroleum ether. Therefore, the caffein present at this point has been unaffected by the solvent extraction, and the use of chloroform at this stage to accomplish caffein extraction can have no undesirable effect on fat or aroma constituents because these have already been removed.

This is important both as avoiding damage to the fat and the aroma and as saving injury to the natural caffein.

The caffein extraction is indicated in Fig. 1 as an optional step introduced between the primary solvent extraction stage and a final water extraction stage, and involving a continuous counter-current extractor 6, an evaporator 7 and a drier 8.

As shown in the diagram, the caffein-laden extract passes through the caffein solvent extractor 6 into evaporator 7, where the chloroform is released, condensed and returned to the process for continuing extraction. The caffein is collected from the evaporator in crystalline form and may be purified for sale as a by-product.

Reuse of the solvent of the caffein extraction is desirable not only because of the saving of the solvent but because of the saving of desirable products that would otherwise be expended with discarded solvent, such as caffein, some of which may sublime in the evaporation, and small amounts of other compounds in the coffee which may be soluble in the chloroform. Recycling of this solvent brings it to a point where it becomes saturated with these compounds, since only caffein is removed from the evaporation step at 7.

From the caffein extractor 6 the grounds pass to a drier 8, where additional solvent is recaptured and returned, as shown, to the caffein extractor.

The dried grounds are next subjected to water extraction at 9. If caffein has been removed, as last described, the grounds will pass direct from drier 8 to the water extractor 9, but if caffein extraction is omitted the grounds will be passed from drier 5 to the water extractor.

The temperature of the water extraction is not critical; a desirable range appears to be between 85 and 90° C. Higher temperatures tend to increase bitter and astringent constituents, whereas lower temperatures extract less, resulting in a flat tasting coffee product.

This water extraction is preferably performed in a continuous, counter-current extractor such as shown in Fig. 2, yielding a solution containing from 5 to 15% solids.

By effecting this water extraction with grounds which are free of both fat and aroma, important advantages are attained, particularly in that unfavorable reactions between water and aroma are avoided and interference by the fat in effecting complete extraction is prevented.

The hot water extract from 9 is concentrated at 10 in a vacuum flash evaporator, to give a syrup containing 35 to 45% solids. The lower the temperature of the evaporation there is the less chance of caramelizing the flavor. A vacuum of 70 mm. of Hg maintains a temperature of about 45° C. This generally is satisfactory, although vacua as low as 30 mm. may improve results if condensing water of sufficiently low temperature is economically available.

Inasmuch as fat and aroma have been eliminated, the evaporation proceeds with no possibility of decomposition or oxidation of these constituents, not present.

The concentrate from evaporator 10 may be reduced to a powder in a spray drier, as shown at 11.

The aroma or some of the aroma separated and collected at 4, Fig. 1, may be added to the product during spray drying by injecting it at the atomizer, as indicated in this view.

Only a fraction of the aroma has been found necessary, usually not more than about one-third of the total extracted.

This is another of the special advantages of the invention in that more aroma is obtained than in the normal hot water extraction practiced to make a coffee infusion, thus providing an excess of aroma which can be sold as a natural coffee flavoring by-product.

If the aroma is added during spray drying, an inert gas such as nitrogen may be recycled to prevent oxidation of the aroma at the high temperatures usually required for spray drying. The aroma constituents have antioxidant properties of their own but the extremely high temperatures of spray drying may increase the rate of reaction to such an extent as to cause damage to the aroma even during the short period of exposure. Hence the need, usually, for recycling with inert gas during spray drying.

Alternately, the aroma may be added to the solid product after spray drying, as indicated by broken lines at 13, Fig. 1.

Under such conditions the spray drying may be effected with combustion gases in the usual manner.

In the latter instance the aroma may be added by spraying it onto the solid product in the form of a concentrated solution in the aliphatic hydrocarbon solvent used for extracting the fat and aroma, and in which instance the solvent is then dried from the powdered aromatized coffee and recaptured by condensation.

It is possible to eliminate use of the vacuum flash evaporator at 10, by making an exceptionally concentrated extract in the water extractor at 9. This enables an extract containing 25 to 35% solids to be fed directly from the water extractor 9 to the spray drier 11. This method may be more economical for smaller productions, where the cost of steam is more important as compared to fixed charges.

The method of concentrating the water extract to a powder may be varied. Thus freeze drying or high vacuum drying may be economically and practically employed, the latter being indicated at 11 in Fig. 2 as a substitute for the spray drying indicated at 11 in Fig. 1.

The high vacuum drying is effected at around 1 mm. of Hg and comparatively low temperatures, around 60° C., so that the aroma constitutents may be safely added during such drying without danger of being distilled off. This will be realized from the fact that the aroma constituents are practically non-volatile as compared to water and distillable only at ultra-high vacua of .01 mm. Hg (10 microns) and temperatures of about 185° C. in a short path molecular still.

The grounds from the water extractor 9, which have been freed of all fatty material soluble in the organic solvent and water soluble material, may be passed through a drier 12 to render them marketable as a by-product filler for plastics or resins.

These grounds being free of fatty and water soluble material such as might interfere with adherence to a plastic or resinous binder, are useful for manufacture of synthetic boards and the like.

In the present process the grounds are freed of those substances which might interfere with use as a filler for synthetic resins or plastic compositions, and are ready for use as such without further treatment.

In the specific example shown in Fig. 2, the optional decaffeinizing stage, including steps 6, 7 and 8, is omitted and a high vacuum drier is substituted at 11 for the spray drier shown at 11 in the first view. These differences will further emphasize the fact that the invention is not, generally speaking, limited to any specific form of apparatus or to all the steps and sequence of operations disclosed.

The fat and aroma solvent extractor is shown at 1 in Fig. 2, as a continuous solvent extractor of the Kennedy extractor type. (Ind. Eng. Chem. 40, 1753, 1948.)

The pulverized roasted coffee is fed into one end of the Kennedy extractor 1 and the extracted grounds pass from the other end into the vacuum drier indicated at 5.

The aroma and fat-freed grounds then pass at 14 from the drier 5 to the continuous extractor 9 in which hot water is circulated in counter-current fashion.

The exhausted grounds are then dried in the vacuum drier at 12 and saved as a by-product filler of plastic or resin compositions, or for other uses.

The solvent extract passes at 15 from the solvent extractor to the stripping column 2, where the solvent is recaptured and condensed together with vapors in the line 16 from the vacuum drier 5, to be returned to the system.

The fat and aroma from the solvent stripping column 2 are fractionated at 3 by a battery of molecular stills of the Hickman type (United States Patent 2,210,928).

The first still, 17, is shown as of the large inverted hat type in which the first fractionation is effected.

The three rotating cone stills 18, 19, 20, are employed to effect better fractionation between aroma, fat and residue.

The aroma is shown as separated at 4 into two parts, with one part sent through the line 21 to the high vacuum drier 11 to aromatize the soluble coffee product, and the remainder or excess saved as a by-product flavoring material.

The fat fraction from still 19 may be used as a by-product edible fat and the residue fat from still 18 may be used for soap manufacture.

The water extract from water extractor 9, concentrated to about 25–35% solids by the countercurrent extraction, is fed through line 22 to the high vacuum drier at 10, which may be of the type described by Schwarz, Ind. Eng. Chem., 40, 2028 (1948).

The water extract or concentrate is fed through the line 23 to the high vacuum drier 11, the aroma being simultaneously added through the line 21, resulting in the aromatized soluble coffee powder product at 24.

The entire operation from start to finish may be continuous. The end result is a superior soluble coffee powder containing all the desirable essences, unharmed by the processing. The excess of aroma produced by the system permits of a grading of the final product to suit different taste requirements.

The fatty constituent, not required in the beverage preparing powder, is saved as a useful and valuable edible fat. Additionally, there is saved the heavier residue fat for soap or other manufacturing purposes. The exhausted and dried coffee grounds, free of fat and water solubles, are useful as fillers for plastics, resins and the like.

If decaffeinizing is desired, this can be effected as a separate stage interposed between the solvent and water extraction steps.

The process, including its various possible modifications, may be performed economically and, for the most part, with equipment of conventional or accepted design.

The possibility of concentrating the water extract to a powder by different methods such as by spray drying, freeze drying or high vacuum, provides a desirable latitude of operation and desirable choice of methods is also present in the aromatizing of the final product before, during and after the drying operation.

What is claimed is:

1. The herein disclosed process of producing a soluble coffee, comprising first solvent extracting fresh ground roasted coffee, fractionating the solvent extract by molecular distillation into separated aroma and fat constituents, hot water extracting the solvent extracted grounds and recombining aroma constituent fractions of the solvent extracted constituents with the hot water extracted constituents.

2. The herein disclosed process of producing a soluble coffee, comprising first solvent extracting fresh ground roasted coffee, fractionating the solvent extract by molecular distillation into separated aroma and fat constituents, then hot water extracting the solvent extracted grounds and recombining aroma constituent fractions of the solvent extracted constituents with the hot water extracted constituents and reducing the final product to a dry soluble powder form.

3. The herein disclosed process of manufacturing a soluble coffee, comprising extracting fresh ground roasted coffee with aliphatic hydrocarbon solvent, stripping the solvent from the extract, fractionating the solvent extract by molecular distillation, extracting the grounds with hot water, evaporating the water to produce a dry powder and aromatizing the same with molecularly distilled fractions.

4. The herein disclosed process of producing soluble coffee, comprising extracting fat and aroma constituents from ground roasted coffee with aliphatic hydrocarbon solvent, fractionating the extracted aroma and fat constituents by molecular distillation, extracting the solvent extracted grounds with hot water, reducing the water extracted constituents to soluble powder and at one stage subsequent to formation of the water extracted constituents combining a portion of the fractionated aroma constituents therewith.

5. The herein disclosed process of producing soluble coffee, comprising solvent extracting fat and aroma constituents from ground roasted coffee, fractionally separating the fat and aroma constituents by molecular distillation, water extracting the solvent extracted grounds, reducing the water extracted constituents to soluble powder and at a stage subsequent to formation of the water extracted constituents combining fractionated aroma constituents therewith.

6. The herein disclosed process of producing soluble coffee, comprising solvent extracting fat and aroma constituents from ground roasted coffee, fractionally separating the fat and aroma constituents by molecular distillation, water extracting the solvent extracted grounds, high vacuum drying the water extract and adding separated aroma constituents thereto in the course of said high vacuum drying.

7. The herein disclosed process of producing soluble coffee, comprising solvent extracting fat and aroma constituents from ground roasted coffee, fractionally separating the fat and aroma constituents by molecular distillation, water extracting the solvent extracted grounds, spray drying the water extracted constituents and adding molecular distilled aroma constituents thereto.

8. The herein disclosed process of producing soluble coffee, comprising solvent extracting ground roasted coffee with aliphatic hydrocarbon solvent at the boiling point of 30 to 70° C. in the absence of air, stripping solvent from the extract in the temperature range of about 80 to 100° C., fractionating the extract by molecular distillation, hot water extracting the grounds, evaporating the water therefrom and aromatizing the latter by addition of a fraction from the molecular distillation fractionation step.

9. The herein disclosed process of producing soluble coffee and by-products, comprising solvent extracting ground roasted coffee with aliphatic hydrocarbon solvent, solvent stripping the extract, fractionating the stripped extract by molecular distillation into a first aroma constituent fraction at temperatures in the region of 185 to 225° C. and pressures around 15 and 10 microns, and an edible oil fraction at temperatures around 240 to 260° C. and pressures of around 6 to 8 microns, hot water extracting the solvent extracted grounds, evaporating water from the latter extract and combining therewith first fractions of the molecular distillation.

10. The herein disclosed process of producing soluble coffee, comprising solvent extracting fat and aroma constituents from ground roasted coffee, fractionally separating the fat and aroma constituents by molecular distillation, water extracting the solvent extracted grounds, high vacuum drying the water extract at around 1 mm. Hg and 60° C.

11. The herein disclosed method of producing soluble coffee, comprising solvent extracting ground roasted coffee, solvent stripping the extract, fractionating the stripped extract by molecular distillation into aroma, edible fat and residue fat, water extracting the grounds, evaporating the water extract and combining therewith aroma fraction of the molecular distillation.

12. The herein disclosed process of producing soluble coffee comprising extracting ground roasted coffee with an aliphatic hydrocarbon solvent, stripping solvent from the extract, molecularly distilling the extract into separate aroma and fatty constituents, hot water extracting the solvent extracted grounds, recombining separated molecularly distilled aroma constituent with the hot water extracted constituent and reducing the recombined product to dry, soluble powdered form.

13. The herein disclosed process of producing soluble coffee comprising first solvent extracting ground roasted coffee, fractionating the solvent extract by molecular distillation into separated aroma and fat constituents, decaffeinizing the solvent extracted grounds, water extracting the solvent extracted, decaffeinized grounds and recombining the separated, molecularly distilled aroma constituent with the water extracted constituent.

14. The herein disclosed process of producing soluble coffee comprising first solvent extracting ground roasted coffee, molecularly distilling the extract under high vacuum and fraction of a second contact into separate aroma and fatty constituents, water extracting the solvent extracted grounds, recombining separated molecularly distilled aroma constituent with the hot water extracted constituent and reducing the combined product to dry, soluble, powdered form.

ROGER GILMONT.

REFERENCES CITED

The following references are of record in the file of this patent:

UNITED STATES PATENTS

| Number | Name | Date |
|---|---|---|
| 2,123,207 | Rosenthal | July 12, 1938 |
| 2,324,594 | Polin | July 20, 1943 |
| 2,481,470 | Cohen | Sept. 6, 1949 |
| 2,542,119 | Cole | Feb. 20, 1951 |